July 25, 1944.    H. L. JOHNSON    2,354,376
CORN SIZING APPARATUS
Filed Feb. 4, 1942    5 Sheets-Sheet 1
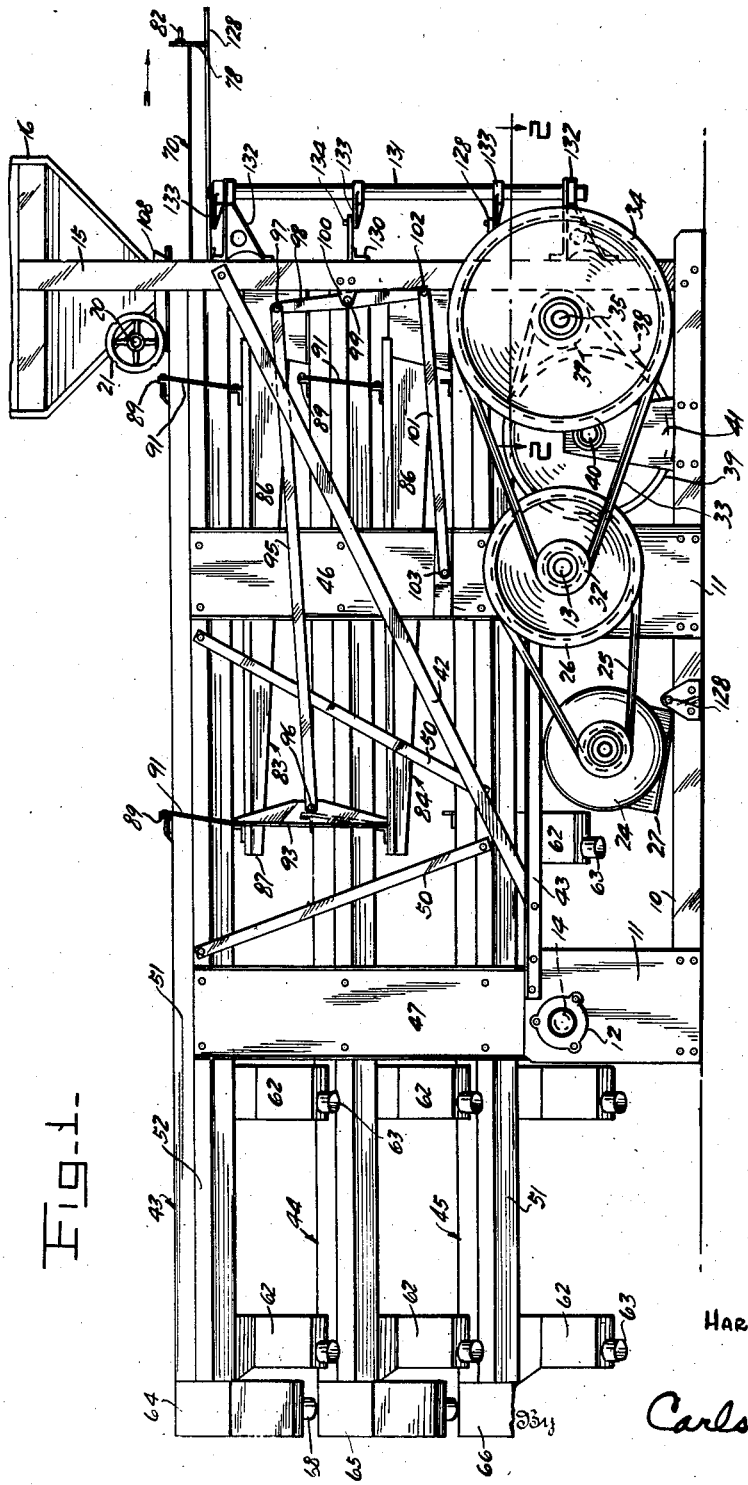
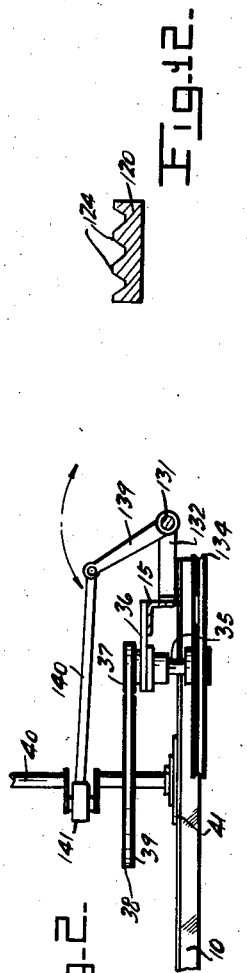
Inventor
HARRY L. JOHNSON
Carlsen + Hayle
Attorneys July 25, 1944.  H. L. JOHNSON  2,354,376
CORN SIZING APPARATUS
Filed Feb. 4, 1942  5 Sheets-Sheet 2
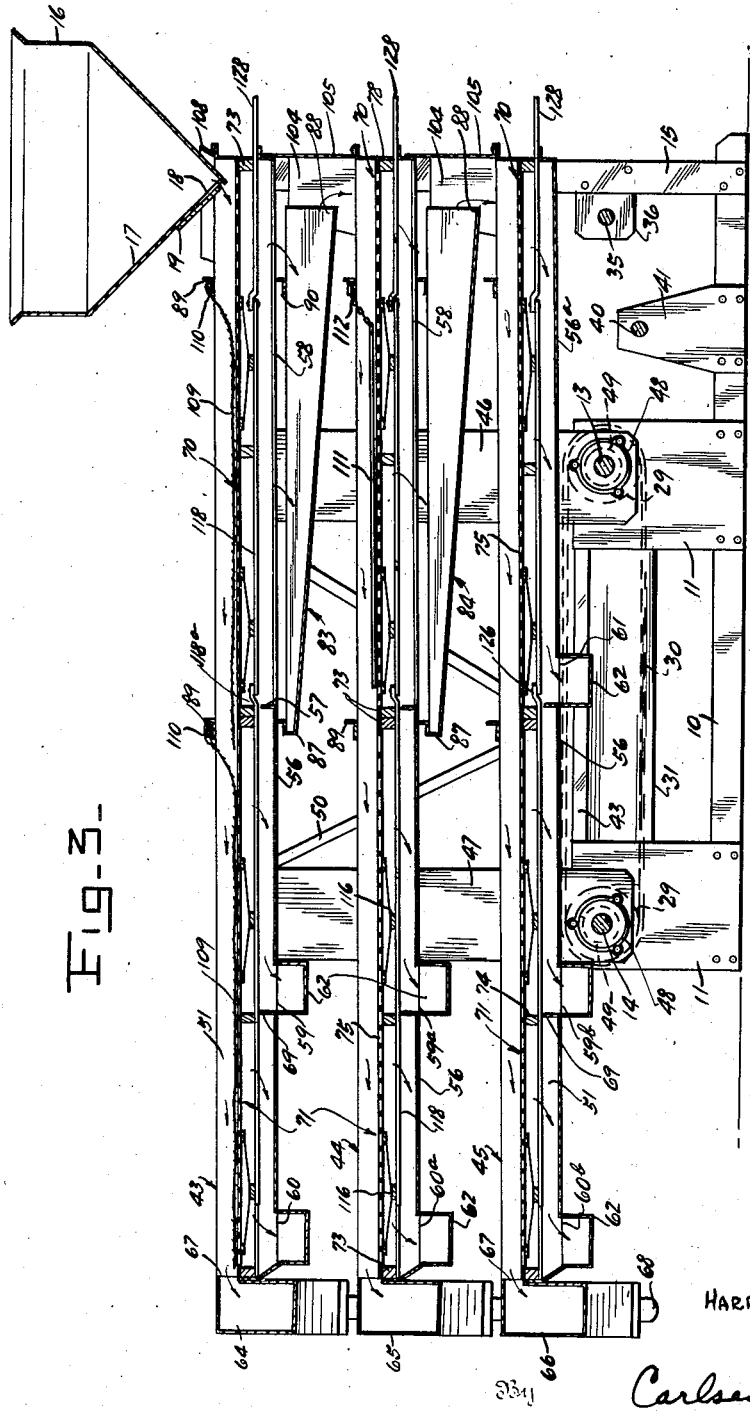
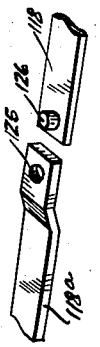
Inventor
HARRY L. JOHNSON
Carlsen + Hogle
Attorneys July 25, 1944. H. L. JOHNSON 2,354,376
CORN SIZING APPARATUS
Filed Feb. 4, 1942 5 Sheets-Sheet 3

Inventor
HARRY L. JOHNSON
By Carlsen & Hayle
Attorneys

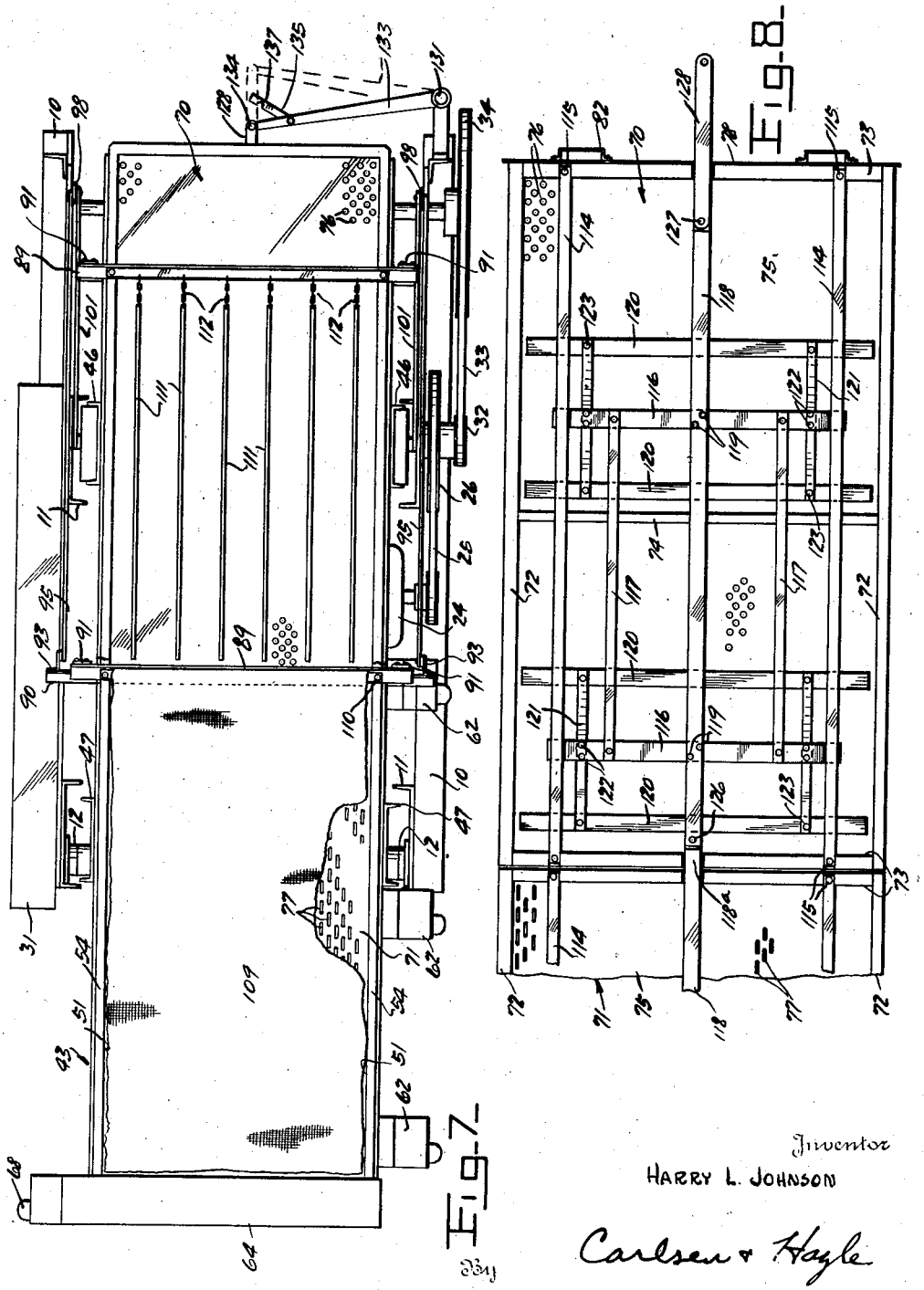

July 25, 1944.   H. L. JOHNSON   2,354,376
CORN SIZING APPARATUS
Filed Feb. 4, 1942    5 Sheets-Sheet 5
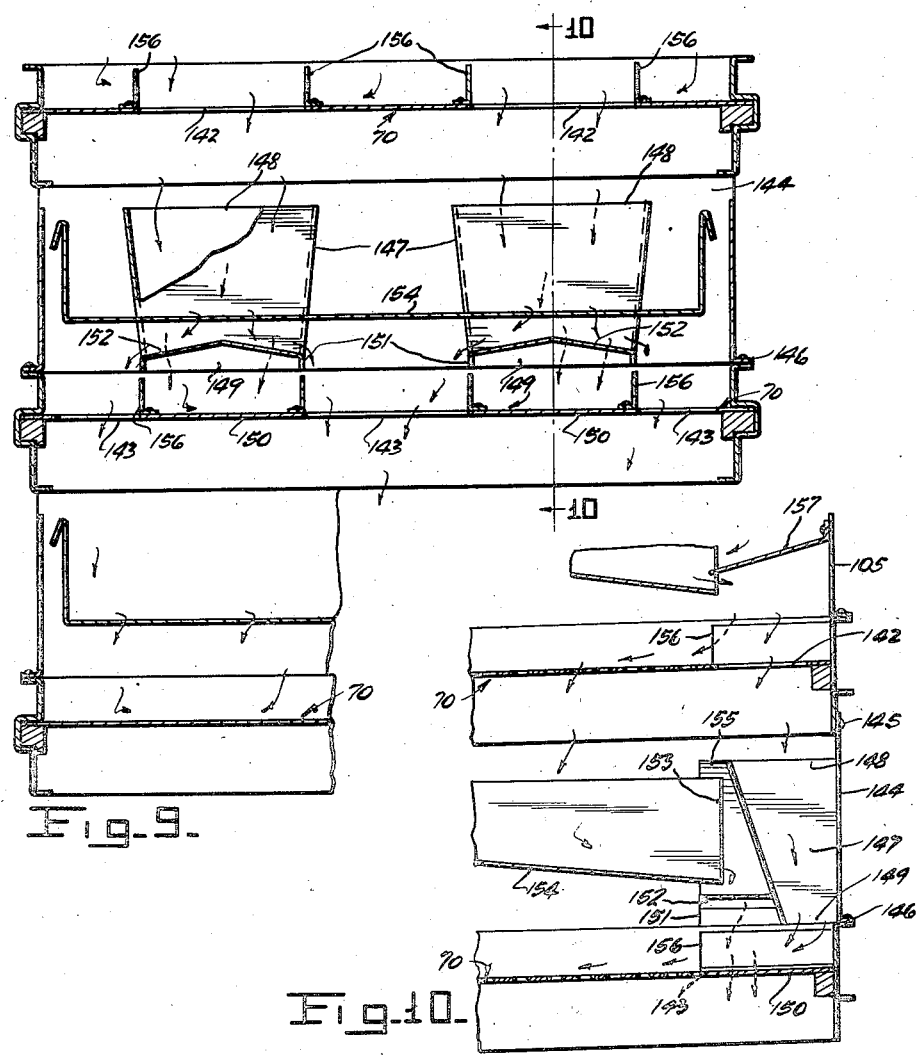
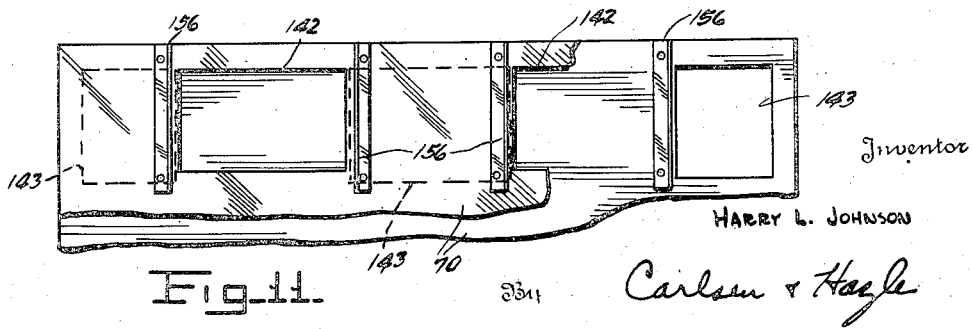

Patented July 25, 1944

2,354,376

UNITED STATES PATENT OFFICE 2,354,376

CORN SIZING APPARATUS

Harry L. Johnson, Minneapolis, Minn.

Application February 4, 1942, Serial No. 429,492

4 Claims. (Cl. 209—316)

This invention relates to improvements in apparatus for separating corn and particularly to a means for separating hybrid seed corn into a plurality of closely and doubly dimensioned sizes to thereby facilitate planting operations.

The primary object of the invention is to provide a machine embodying a plurality of vibrating screens apertured or reticulated in such manner as to make almost any desired number of separations or groupings of the corn according to width and to thickness dimensions and capable of being set up and arranged in a compact assembly to make all such separations in a single run. To this end the apparatus contemplates a screen arrangement such that two separate screens are arranged end to end in each layer, or deck, of the machine one to make separations as to width and the other as to thickness and with means for separately classifying and delivering at least four grades of corn from each layer or deck thus constructed.

Another object is to provide a compact and rapidly operating apparatus of this nature embodying return pans for collecting sized particles from each screen and conveying them to the screen next below for further sizing, said pans being vibrated by the screens themselves but in an opposite direction to thus carry the collected corn sizes toward the head or receiving end of the screens. Another and related object is to provide novel and effective means for flexibly supporting the return pans from the screens to permit such movements.

A further object is to provide novel and effective means for preventing the corn from piling up upon the screens and for properly holding or urging the corn kernels into engagement with the screens.

A further object is to provide by-pass means for distributing the corn to the various screens and preventing overloading of any one screen should the corn, as sometimes occurs, be largely composed of kernels of a certain size.

Still a further object is to provide novel and effective wipers or screen clearing means arranged to prevent lodgement of the corn kernels in the perforations of the screen and with novel operating and connecting means for the wipers to permit convenient removal and replacement of the screens when setting up the apparatus to size specifications.

These and other more detailed and specific objects will be disclosed in the course of the following specification, reference being had to the accompanying drawings, in which—

Fig. 1 is a side elevation of my corn sizing apparatus, an upper screen being shown as partially pulled out endwise in process of removal.

Fig. 2 is a fragmentary horizontal sectional view along the line 2—2 in Fig. 1 showing the actuating mechanism for the screen wipers.

Fig. 3 is a longitudinal vertical section through the apparatus.

Fig. 4 is an enlarged fragmentary perspective view of the adjacent connecting ends of the wiper actuating bars.

Fig. 7 is a plan view of the apparatus, the feed hopper being removed.

Fig. 8 is an enlarged inverted plan or bottom view of one screen and a fragment of the next.

Fig. 9 is a fragmentary vertical cross sectional view through receiving end portions of the screens showing the by-pass or distributing means for the corn.

Fig. 10 is a vertical longitudinal sectional view along the line 10—10 in Fig. 9.

Fig. 11 is a plan view of an end portion of the screens of Figs. 9 and 10.

Fig. 12 is an enlarged cross section through one of the screen wipers or wiper bars.

Figure 5:
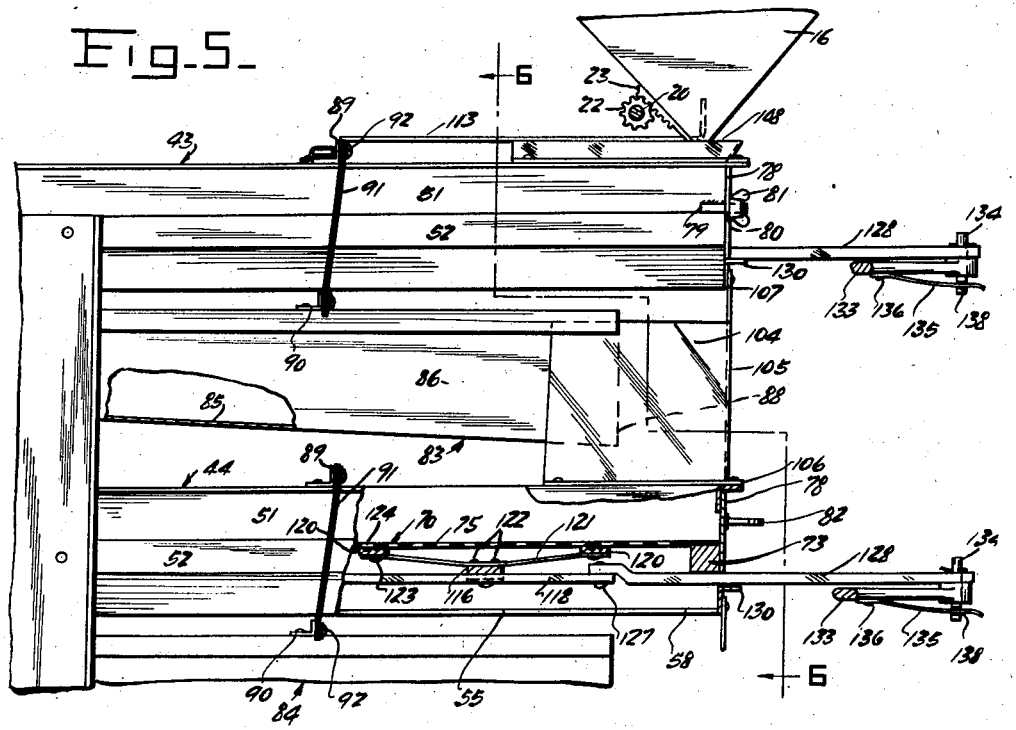
Fig. 5 is an enlarged fragmentary side elevation, partially in longitudinal and vertical section, of an upper end portion of the apparatus.

Referring now more particularly and by reference characters to the drawings, my improved apparatus comprises a mounting and supporting frame having base members 10 set up in parallel relation to which are secured upright bearing members 11 in spaced oppositely aligned pairs and provided with bearings 12 in which are journaled transverse shafts 13 and 14. Also secured to the base members at one end are upright posts or side members 15 between which, at upper ends, is supported a feed hopper 16. Said hopper has in one sloping side 17 a feed opening or slot 18 running its full width and this opening may be progressively opened or closed to vary the rate of feed by a sliding gate 19 moved through the medium of a shaft 20 turned by hand wheel 21 and carrying at least one gear 22 meshing with a rack 23 on the gate (see Figs. 1 and 5).

The shafts 13—14 are rotated, and the entire apparatus operated by a suitable prime mover such as an electric motor 24 which as here shown is connected by a belt 25 to a pulley 26 on one extended end of shaft 13, the belt being kept taut by arranging the motor on a base 27 pivoted at 28 to the base members 10 as clearly shown in Fig. 1. The shafts 13—14 are connected by sprockets 29 and chain 30 at one end and this drive connection is enclosed within a guard housing 31. The shaft 13, which may be termed the main or driving shaft, also carries a small pulley 32 over which is trained a belt 33 driving a large pulley 34 on a countershaft 35 journaled in bearing brackets 36 on the side posts 15. A smaller pulley 37 on countershaft 35 in turn drives a belt 38 over a larger pulley 39 on a crankshaft or wiper drive shaft 40 which is journaled in bearing brackets 41 secured to the base members 10. The crankshaft 40 of course is rotated much slower than shafts 13—14 by virtue of the speed reduction afforded by this arrangement but obviously other driving means, such as sprockets or gears, may be used if desired. The function of the various shafts will presently appear.

The side posts 15 are braced by angularly extending bars 42 secured between their upper portions and tie bars 43 which join the bearing members 11.

The screen assembly or screen mechanism is supported above the frame thus described and in the embodiment here shown has three screen layers or decks comprising stacked shoes designated generally at 43—44 and 45, although more or less than three of such elements may be used as may be desired and according to the number of sizes or classifications of the corn required. Each shoe is spaced from the one next beneath and parallel thereto and they are secured in such relation between spaced pairs of uprights or tie members 46—47 which at lower ends extend loosely between the upper ends of the members 11 with which they are substantially vertically aligned. These lower ends of the uprights 46—47 carry bearings 48 which engage eccentrics 49 carried by the shafts 13 and 14 and by such mounting not only are the screen shoes supported but they are also given a rotary, vibratory movement by the eccentrics at a frequency dependent upon the motor speed and ratio of the drive between the motor and shaft 13. The individual shoes are further connected by angularly extending braces 50 as seen in Fig. 1 to operate as a unit.

The construction of the shoes 43, 44 and 45 differ in only minor details and a description of one will accordingly suffice for all. Each shoe comprises a pair of side frames 51 having medial, longitudinally extending and outwardly pressed ribs 52 which not only stiffen them but also provide interior channels 53 to slidably receive the edges of the screens as will presently appear. Upper margins of these side frames 51 are outwardly flanged as at 54 while lower margins have inwardly turned flanges 55. The shoes slope somewhat from what may be termed their heads or receiving ends (beneath the feed hopper 16) toward their tails or delivery ends and the uppermost shoe is arranged beneath the hopper so that the corn fed from the opening 18 therein will fall upon the head of the screen therein. However, and this is important, the shoes by the very nature of their operation and construction need have but little, if any, slope or inclination since the corn, as has been found in practice, will progress along the screens without the necessity of sloping the screens. Obviously the vertical height of the apparatus may thus be held down resulting in a very desirable compactness.

On each of the uppermost two shoes 43 and 44 the lower flanges 55, from about the longitudinal centers of each shoe to its tail end, are joined by a bottom plate 56 which closes substantially one-half of the bottom of each shoe and has an upwardly turned forward end 57 clearing the channels 53. From this flanged end 57 forward, or to the head end of each of these shoes, the bottom is then open as designated at 58. On the contrary, the lowermost shoe 45 is closed by a bottom 56ª throughout its length as seen in Fig. 3. However the shoes each have in their respective bottom plates 56 and 56ª a pair of transversely extending discharge openings or slots designated at 59—60 for shoe 43, 59ª—60ª for shoe 44, and 59ᵇ—60ᵇ for lower shoe 45, and in addition the latter has a third similar slot or opening 61. The slots 59, 59ª and 59ᵇ are located about midway between the longitudinal centers of the shoes and their tail ends while the slots 60, 60ª and 60ᵇ are located immediately at said ends. The slot 61 on the other hand is located at about the center of the lower shoe as clearly shown in Fig. 3. Beneath each slot a transversely extending and sloping discharge duct 62 is provided having a lateral spout 63 for the attachment thereto of a flexible tube or conduit (not shown) for leading off the corn discharged at the various slots.

Also at the tail ends of the shoes transversely extending and sloping discharge ducts 64, 65 and 66 are arranged and having openings 67 in their sides adjacent said ends. Said ducts also have spouts 68 similar to those previously described.

Adjacent the slots 59, 59ª and 59ᵇ the bottoms 56 also have upwardly turned ends, or baffles, 69 the purpose of which is to guide the corn into the slots and into the ducts 62 adjacent thereto as will presently appear.

Each shoe 43, 44 and 45 carries a pair of screens arranged end to end therein and here again, since the screens for the various shoes are identical except as to the sizes of their respective openings, a description of one pair of screens will suffice for all. The screens for each shoe are designated generally at 70 and 71 and each comprises a rectangular frame having sides 72, ends 73 and a medially located transverse brace bar or cross piece 74. Each screen frame is covered by a flat screen plate 75 which is secured at its margins thereto and in one screen 70 the openings 76 are round while in the other 71 the openings are in the form of narrow slots 77 arranged lengthwise in the plate. The width of the screens, and the vertical thickness of the frame sides 72, are such that the screens may be readily slid one at a time endwise into the shoes with the sides slidably received in the channels 53. The screens are thus inserted from the head ends of the shoes as will be evident and in preferred arrangement here shown the slotted screen 71 is first inserted and then followed by the round holed screen 70 so that the corn will first work over the round holes 76 and then over the slots 77 as it moves toward the tail ends of the shoes.

Figure 6:
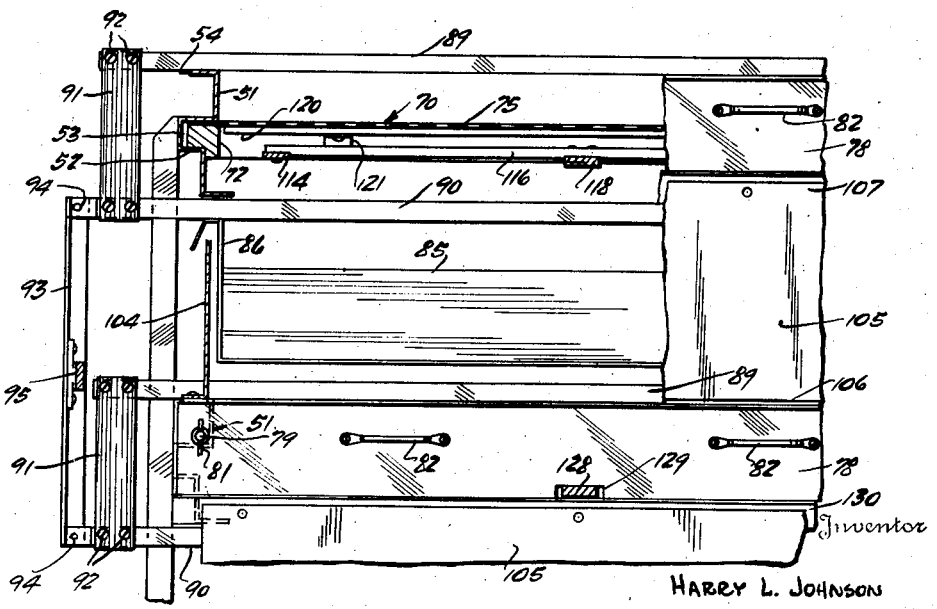
Fig. 6 is a view taken along the line 6—6 in Fig. 5.

The length of each pair of screens is such that they will, when thus arranged end to end, fill the shoes lengthwise and the screens last inserted are provided with face plates 78 across their ends designed to close the head ends of the shoes as best seen in Figs. 5 and 6. Studs 79 welded, or otherwise secured, to the shoes enter openings 80 in these face plates 78 as the screens are pushed home and wing nuts 81 may then be turned up on these studs to lock the screens in the shoes. The face plates also have handles 82 to facilitate insertion and removal of the shoes, drawer fashion, into and out of the shoes.

Return pans 83—84 are arranged beneath the upper two shoes 43 and 44 and, more specifically, below the bottom openings 58 therein, said pans having bottoms 85 sloping downwardly from their ends adjacent the flanges 57 toward the head ends of the shoes. Said pans also have sides 86 and are closed at their higher or receiving ends 87 but open at their lower, discharge ends 88.

Substantially above each end portion of each pan 83—84 a hanger member or angle bar 89 is secured across the flanges 54 of the respective shoes 43—44 there being thus four of such members and all of them having their ends extended well beyond the sides of the shoes as best shown in Fig. 6. Similarly arranged and mounted hanger members, or angle bars 90 are secured across upper margins of the pans. Between the extended ends of these members 89—90 flexible hanger strips 91 of rubber or similar material are secured, as by means of screws 92, and said strips are arranged between each lower portion of the pans upwardly to the members 89 thereabove in order thus to support the pans beneath the respective shoes. Obviously, while the strips 91 will support the pans against downward displacement, they will permit the pans to swing or oscillate freely beneath the shoes and such movements will necessarily be in a lengthwise direction with respect to the shoes, since the strips 91 are disposed with their wider dimensions extended transversely to the pans and shoes as clearly shown.

The hanger members 90 on the pans 83—84 nearest their higher ends 87 are extended beyond the strips 91, as seen in Fig. 6, and are rigidly connected by upright tie members 93 secured at 94 to these extended ends. To these members 93, at each side of the machine, link bars 95 are pivoted, as at 96, and extend therefrom toward the side posts 15 near which they are pivoted at 97 to the upper ends of rocker bars 98 fulcrumed intermediate their ends at 99 upon brackets 100 affixed to said posts. Link bars 101 are then pivoted at 102 to lower ends of the rocker bars 98 and extend back beneath the link bars 95, being pivoted at 103 to the upright side members 46 as shown in Fig. 1. The foregoing arrangement is such that the oscillating motion of the screen assembly will rock the bars 98 on their pivots 99 through action of the lower link bars 101, and such rocking motion will be transmitted to the return pans 83 and 84 by the upper link bars 95. However, the movement of the screen assembly will be translated to an opposite movement of the return pans causing the pans to shift horizontally and endwise in one direction as the screen shoes move in the opposite direction, as should be readily apparent.

The discharge ends 88 of the return pans 83—84 enter loosely between the upstanding sides 104 of guard members between the shoes, said sides being turned from the lateral margins of transverse, upright plates 105 secured by base flanges 106 and upper margins 107 between the shoes as clearly shown. Such guards are of course for the purpose of preventing the corn falling from the pans from flying off the sides or ends of the shoes. For a similar reason the uppermost shoe carries a narrow upstanding guard flange 108 around its sides and end beneath the hopper 16.

In the operation of the machine as thus far described the seed corn, of heterogeneous sizes, is of course placed in the hopper 16 from which it is fed at a suitable rate, controlled by manipulating the hand wheel 21, to fall upon the head of the screen 70 in the uppermost shoe 43. The motor 24 being then in operation the entire screen assembly is given a vibratory action in which there is a vertical component such that the corn kernels upon the screens 70—71 will be tossed upwardly to fall back and either pass through, or be rejected by, the openings 76—77 therein. As is well known in the art the two important dimensions in corn for seeding purposes are the width and thickness of the kernels and the round openings or holes 76 will, in well known manner, size the kernels as to width while the slotted openings 77 will size as to thickness. The screens are of course set up with regard to the size of their respective openings to pass successively smaller kernels in both dimensions as they progress downwardly from shoe to shoe.

Considering first the operation of the uppermost shoe 43, in which screens having the largest openings are usually arranged, it will be evident that the corn falling from the hopper will first be sized as to width, the throughs or kernels passing the round holes 76 falling through the opening 58 into the return pan 83. Corn rejected by this screen will flow toward the tail end of the shoe due to the vibratory action employed and will then flow over the screen 71, being classified as to thickness by the slots 77 therein. The slots in that half of this screen next to screen 70 are larger, or of greater width than those in the remainder of the screen and the larger width sized kernels or throughs from the larger slots will obviously fall through slot 59 into the duct 62 for separate collection. Corn kernels passing through the narrower slots in the remainder of the screen then flow through the slot 60 for another and separate collection. Rejected kernels from both screens will fall into the end duct 64 and this oversize corn may be used as reserve or discarded for seeding purposes.

The corn falling into the uppermost return pan 83 is carried back to the head of the screen mechanism and delivered upon the screen 70 in shoe 44, being then subjected to another width sizing by the round holes 76 therein and the throughs falling into the next lower return pan 84. The rejects or overs from this width sizing are then subjected to two thickness sizings upon the screen 71 in shoe 44 and the throughs are separately delivered through the slots 59a—60a as doubly dimensioned seed classifications. The rejects from this shoe are then delivered through duct 65.

In similar manner the corn falling from the return pan 84 is sized as to width by the screen 70 in the lowermost shoe 45 and the throughs are, in this case of useless small sizes, delivered through slot 61 and duct 62 for separate collection. The corn rejected by screen 70 is then doubly sized as to thickness by screen 71 with the two sizes delivered from slots 59b and 60b while the oversize or rejects are delivered by duct 66. It will be noted that the rejects or culls from duct 62 have only been sized as to width and this culling operation therefore does not reduce the capacity of the slotted screens.

From the foregoing it will be evident that by a continuous, single run operation no less than twelve separate classifications of corn are secured, four from each shoe, and obviously additional shoes may be arranged in the mechanism to secure further classifications if desired. The flow and screen arrangement is further such that no doubling up or duplicate sizings of the same corn are carried out. The screens may be readily removed and others substituted having openings of any size according to the grades of corn required.

To assist in proper engagement between the corn kernels and screens aprons 109 of cloth or flexible sheet material may be laid over the screens 70—71 in any shoe, such aprons being here shown as arranged only on the upper shoe 43. These aprons are fastened at one end around bars 110 which may be secured to the hanger members 89 so that the aprons will trail off downwardly toward the tails of the screens (Fig. 31) and thus allow the corn to work readily beneath but prevent too great bouncing of the corn upon the screens.

Under some circumstances the corn is found to pile up or collect upon the round holed screens 70 in particular, and to avoid this deleterious action I provide loose beater rods or fingers 111 which are connected at one end by chains or similar light flexible members 112 to the hanger member 89 nearest the head end of the shoe to trail off loosely toward the tail of the screen. These rods will bounce about as the screen mechanism vibrates, effectively breaking up any concentrations or piles of corn which may tend to collect.

Wire fingers 113 (Fig. 5) may be secured to the uppermost hanger member 89 near the hopper 16 and extended through the feed opening 18 up into the corn. Since these fingers will then vibrate with the screening mechanism they will stir and agitate the corn in the hopper to facilitate proper feeding action.

There is some tendency in machines of this nature for corn kernels to become lodged in the openings in the screens and to dislodge such kernels I provide the following mechanism. Beneath each screen 70—71 there is extended a pair of longitudinal guide strips 114 parallel to and adjacent the frame sides 72, being secured at their ends at 115 to the frame ends as seen in Fig. 8. Two carrier bars 116 are extended transversely between the guide strips 114 with the ends notched and slidably engaging upper sides of the strips and such bars 116 are connected and held in parallel relation by brace strips 117 secured therebetween. Flat operating bars 118 are slidably arranged lengthwise and centrally beneath each screen and are secured at 119 to the carrier bars 116 so that by reciprocating said operating bars the carrier members will be moved back and forth beneath the screens. For each carrier bar 116 two screen wiper bars or strips 120 are provided and leaf springs 121 secured between their ends at 122 to upper sides of the bars 116 are extended endwise and secured at 123 to the wipers 120 to hold them parallel with the carriers and transversely to the screens. Said springs further urge the wipers yieldably upward against undersides of the screen plates 75 and obviously by reciprocating these wiper assemblies for each screen the lodged kernels of corn in the openings 76 and 77 may be dislodged and caused to travel on. The upper or screen engaging sides of the wipers 120 are longitudinally ribbed or serrated as shown at 124 to facilitate this operation and to have a sort of cam action on lodged kernels to urge them upwardly without injuring them.

The operating bars 118 for the wipers on the screens 71, which are first inserted into the shoes, have their ends 118ª extended beneath the tail ends of screens 70 and these ends have apertures 125 (Fig. 4) to receive pins 126 secured to the adjacent ends of the bars beneath said screens 70. In inserting the screens the pins 126 are engaged in the openings 125 and the wipers on each pair of screens will then operate as a unit. Also such connection causes the screens 71 to be pulled out in the shoes so that they may be reached and released when the screens 70 are withdrawn from the shoes as will be understood.

The ends of the operating bars 118 nearest the heads of the screens have attached thereto, by pivots 127, the links 128 which extend loosely outward through the face plates 78, which are slotted at 129 for this purpose, and these links are upwardly supported and guided when the screens are in operative position by angles 130 secured across the ends of the side members 51 of the shoes. An upright rocker shaft 131 is journaled in bearing brackets 132 secured to one side post 15 and at spaced points this shaft carries radially extending arms 133 which extend at their ends toward the ends of the links 128. Both the arms 133 and the links 128 are apertured at their ends to pivotally receive connecting pins 134 which are detachably held in engaged position with these parts by latches 135 pivoted beneath the arms at 136 and having notches 137 to engage peripheral grooves 138 in said pins. When said latches are swung aside (Fig. 7) the pins may be upwardly removed.

Adjacent its lower end the rocker shaft 131 carries a crank arm 139 which is connected to one end of a connecting rod 140 which operates at its other end on a crank or eccentric 141 on the shaft 40 and as said shaft rotates slowly, in the manner described, it is evident that the rocker shaft will be oscillated about its vertical axis. Such operation will swing the arms 133 back and forth in the horizontal plane toward and away from the shoes and will accordingly slowly reciprocate the wiper operating bars 118 beneath each screen in the desired manner.

When removing the screens the pins 134 are removed as described after which the screens may be readily pulled clear of the shoes. The pins are then of course replaced when new screens are put in place.

It sometimes occurs, due perhaps to unusual soil and growing condition in a seed corn growing area, that by far the larger part of the corn is of a certain width instead of widely varying in this dimension as is the usual case. When the sizing apparatus is used under such conditions there is obviously a tendency of the round holed screens to flood with corn since the greater share of the corn will pass a certain size of opening. To overcome this flooding tendency I employ the by-pass means shown in Figs. 9, 10 and 11.

The screen 70 in an upper shoe is provided at its head or receiving end with transversely spaced openings 142 which in their aggregate width, crosswise of the screen, equal substantially one half the total width of the screen. The screen 70 in the next shoe below (having sizing openings of the same diameter) then has center and side openings 143 which fall in the vertical plane between and outwardly of the openings 142 and also aggregate in width about one half the width dimension of this screen.

The by-pass means, per se, is substituted for the guard 104—105 between the shoes carrying the screens thus apertured and comprises a back plate or supporting plate 144 secured at its upper edge 145 to the upper shoe and by its base flange 146 to the next lower shoe. Funnel-like chutes 147 are secured to this plate 144 and taper downwardly at sides and inner ends from their upper to their lower ends, both ends being open. As best seen in Fig. 10 the upper ends 148 of these chutes are well adapted to receive corn kernels falling through the openings 142 while the lower ends 149 are disposed above the closed portions 150 of the screen between the center and side openings 143 to guide these kernels downwardly onto that screen. Guide wings 151 having laterally sloping surfaces 152 are arranged at the lower, inner sides of the chutes 147 immediately beneath the discharge end 153 of the return pan 154. The plate 144 may have sides 155 extended inwardly to guard against the lateral escape of grain. Upstanding wall or partition members 156 are secured to the screens along lateral margins of the openings 142 and 143.

In operation about one half of the corn feeding upon the screen having the openings 142 will now be handled by that screen and the remaining part will fall directly through the openings 142 and then down through the chutes 147 and upon the closed areas 150 between the openings 143, being then sized by this screen, and thus splitting the corn evenly between these two screens. The corn passing through the uppermost screen 70 (through its sizing openings) and falling into return pan 154 will fall therefrom onto the guide wings 151 and will be guided by the sloping surfaces 152 thereof outwardly to fall through the openings 143 and directly down to the screen 70 next below, to prevent repeat sizing. Thus it will be seen that each screen will handle a part of the corn and no single screen can possibly be flooded as would be the case if the majority of the corn passed the upper screen and fall directly to the one next below, along with the sized corn from the pan 154.

The purpose of staggering the openings 142—143 as described and shown is of course to spread the streams of corn evenly over the head ends of the screen and utilize the full width of the screens. The partitions prevent comingling of the various streams of corn.

To prevent corn sized by the shoe next above the screen having the openings 142 from falling directly through these openings, I may arrange a baffle 157 to guide the corn into the adjacent return pan as seen in Fig. 10, supporting said baffle from one of the cross plates 105. However in the three shoe machine the hopper will of course feed the upper screen shown in Fig. 9 and such baffle may not be used.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a corn sizing apparatus having a plurality of superimposed screens arranged to receive corn at one end and progress said corn toward the other end while making size classifications thereof, one screen having openings adjacent its receiving end to pass a portion of the corn directly downward without sizing, means for collecting corn sized by this screen, the screen next below having openings to pass this sized corn from the said collecting means directly down to a second lower screen, and guide members disposed on the screen beneath said collecting means between the openings in that screen, the said guide members having laterally sloping portions for guiding corn flowing from the collecting means downwardly through said openings.

2. In a corn sizing apparatus having a plurality of superimposed screens adapted to receive the corn at one end and progress it toward the other end while making size classifications thereof, a first screen having openings in its receiving end for passing a part of the corn directly downward to the second screen, chute members disposed beneath the first screen for delivering the corn passed through the openings therein to the second screen, the said second screen also having openings in its receiving end and these openings being offset from vertical planes passing through the corresponding openings in the first screen, means for collecting and guiding the corn passing through the first screen into and through the openings in the second screen, and a third screen arranged beneath the second screen for receiving the corn passed through the openings therein.

3. In a corn sizing machine, a hopper, a series of superimposed vibratory screens arranged to receive corn at one end and progress said corn toward the other end while making size classifications thereof, two upper screens of the series having identically sized classifying openings, and a third, lower screen, having relatively smaller classification openings, means for dividing a supply of corn discharged from the hopper into two parts and respectively conducting such parts to the receiving ends of the said two upper screens whereby said two screens will perform identical functions in classifying the corn supplied thereto, and means for directing the corn passing through both of said screens onto the third mentioned screen for reclassification by the relatively smaller openings therein.

4. In a corn sizing machine, a series of vibratory screens having round and slotted openings for the width and thickness classification of corn as the same is passed thereover, two of such screens having round openings of identical size so as to reject corn of like minimum widths on both screens, a third screen having round openings smaller in size than those of the said two screens, means for supplying a continuous flow of unsized corn, means for dividing such flow of corn into parts and directing such parts to said two screens for similar classification thereby, and means for directing the corn passing through both of said two screens in a reunited flow over the third screen for classification thereby.

HARRY L. JOHNSON.